United States Patent
Takeda

(10) Patent No.: US 9,359,008 B2
(45) Date of Patent: Jun. 7, 2016

(54) STABILITY CONTROL DEVICE

(71) Applicant: Nissan Motor Co., Ltd., Yokohama-shi, Kanagawa (JP)

(72) Inventor: Yuya Takeda, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/427,894

(22) PCT Filed: Sep. 25, 2013

(86) PCT No.: PCT/JP2013/075799
§ 371 (c)(1),
(2) Date: Mar. 12, 2015

(87) PCT Pub. No.: WO2014/054474
PCT Pub. Date: Apr. 10, 2014

(65) Prior Publication Data
US 2015/0210318 A1    Jul. 30, 2015

(30) Foreign Application Priority Data

Oct. 1, 2012  (JP) ................................. 2012-219025

(51) Int. Cl.
*A01B 69/00* (2006.01)
*B62D 15/02* (2006.01)
*B62D 6/00* (2006.01)
*B62D 6/04* (2006.01)

(52) U.S. Cl.
CPC .............. *B62D 15/025* (2013.01); *B62D 6/003* (2013.01); *B62D 6/008* (2013.01); *B62D 6/04* (2013.01)

(58) Field of Classification Search
None
See application file for complete search history.

(56) References Cited

U.S. PATENT DOCUMENTS

| | | | |
|---|---|---|---|
| 8,457,868 B2 | 6/2013 | Tange et al. | |
| 2015/0217801 A1* | 8/2015 | Takeda | B62D 6/008 701/42 |
| 2015/0225014 A1* | 8/2015 | Takeda | B62D 6/008 701/41 |
| 2015/0232124 A1* | 8/2015 | Takeda | B62D 15/025 701/42 |

FOREIGN PATENT DOCUMENTS

| | | |
|---|---|---|
| EP | 2248710 A1 | 11/2010 |
| JP | 10-258751 A | 9/1998 |
| JP | 2000-25630 A | 1/2000 |
| JP | 2000-190863 A | 7/2000 |
| JP | 2001-301638 A | 10/2001 |
| JP | 2003-137127 A | 5/2003 |
| JP | 2006-56372 A | 3/2006 |
| JP | 2007-269278 A | 10/2007 |
| JP | 2010-173510 A | 8/2010 |
| JP | 2010-188884 A | 9/2010 |
| JP | 2010-188976 A | 9/2010 |
| WO | 2009/110151 A1 | 9/2009 |

* cited by examiner

*Primary Examiner* — Adam Alharbi
(74) *Attorney, Agent, or Firm* — Global IP Counselors, LLP

(57) ABSTRACT

A stability control device is provided that is capable of reducing an unpleasant sensation imparted to a driver in a steer-by-wire vehicle. The stability control device includes a steer-by-wire controller that controls a turning amount of the turning part based on a steer-by-wire turning amount that corresponds to a steering amount of the steering unit, a turning amount for suppressing the yaw angle, which is an angle formed by a white line and a traveling direction of a host vehicle, and a turning amount for returning the host vehicle to the center of a lane when the host vehicle has departed from the center of the lane. The controller controls a steering reaction force based on the steering amount without the yaw angle-suppressing turning amount and the lane-center-returning turning amount being reflected in the steering reaction force imparted to the steering unit.

6 Claims, 11 Drawing Sheets

STABILITY CONTROL DEVICE

CROSS-REFERENCE TO RELATED APPLICATIONS

This application is a U.S. National stage application of International Application No. PCT/JP2013/075799, filed Sep. 25, 2013, which claims priority to Japanese Patent Application No. 2012-219025 filed in Japan on Oct. 1, 2012.

BACKGROUND

1. Field of the Invention

The present invention relates to a stability control device.

2. Background Information

Japanese Laid-Open Patent Application No. 2000-25630 discloses a steer-by-wire steering device in which the steering wheel and the turnable wheels are mechanically separated, in which a steering reaction force component corresponding to an external disturbance is imparted to the steering wheel so as to obtain a turning angle of the turning wheels that suppresses the effect on vehicle behavior generated by a crosswind or other external disturbance.

SUMMARY

However, this conventional technique has a drawback in that the driver experiences an unpleasant sensation because a steering reaction force component that urges a turn for suppressing an external disturbance is imparted to the steering wheel. An object of the present invention is to provide a stability control device capable of reducing an unpleasant sensation experienced by the driver.

In the present invention, when a turning part mechanically separated from the steering unit is to be controlled, the turning part is controlled based on a turning amount that corresponds to the turning amount of the steering unit, a turning amount for suppressing a yaw angle, which is the angle formed by a white line and the traveling direction of the host vehicle, and a turning amount for returning the host vehicle to the center of the lane when the host vehicle has departed from the center of the lane, and meanwhile, the steering reaction force corresponding to the turning amount for suppressing the yaw angle is limited to a predetermined value or less.

Consequently, it is not required to impart a steering reaction force component for urging a turn for suppressing an external disturbance, and it is possible to suppress fluctuation in the steering reaction force produced by the turn for suppressing the yaw angle. It is therefore possible to reduce an unpleasant sensation experienced by the driver.

BRIEF DESCRIPTION OF THE DRAWINGS

Referring now to the attached drawings which form a part of this original disclosure.

DETAILED DESCRIPTION OF THE EMBODIMENTS

Figure 1:
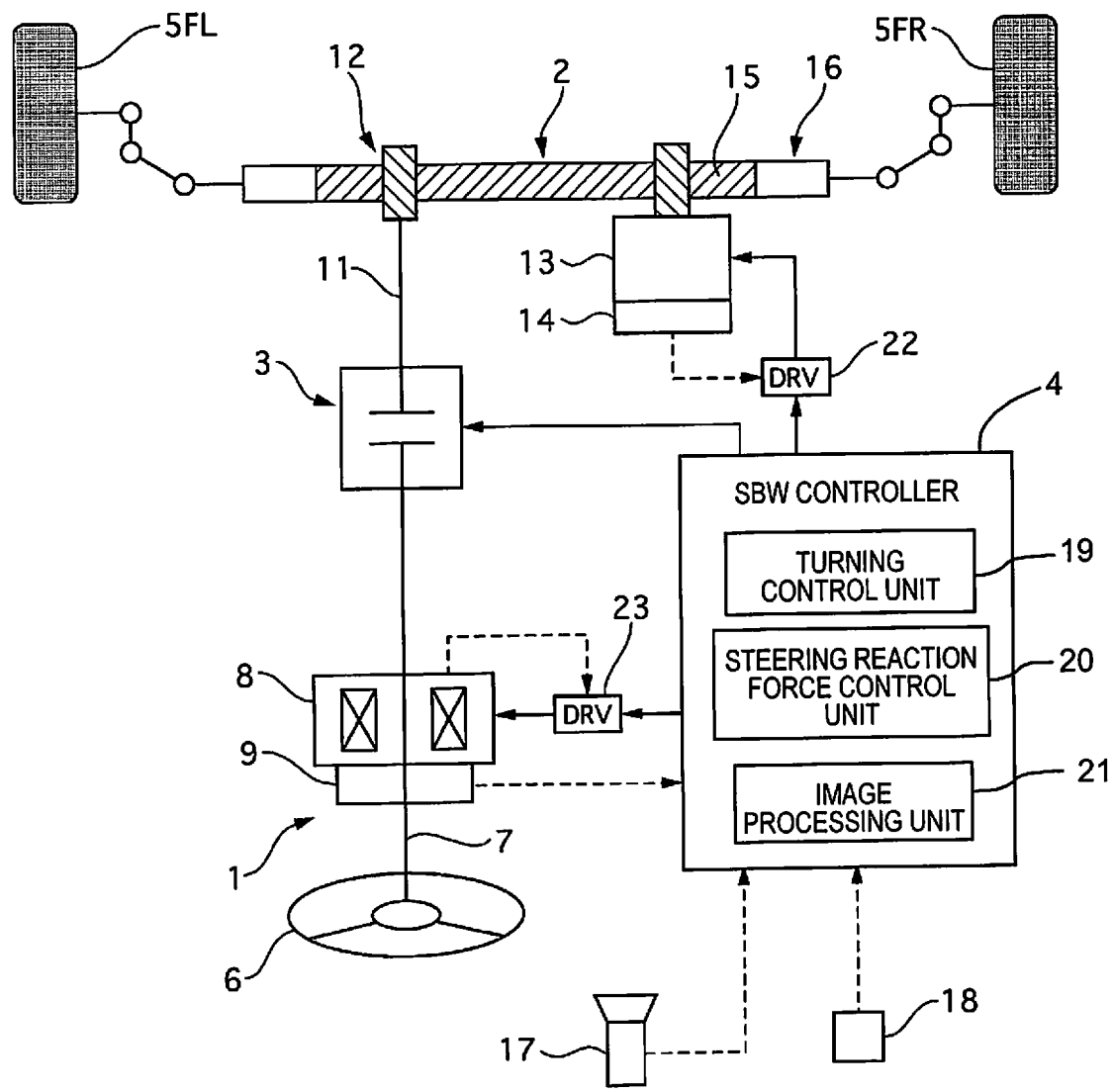
FIG. 1 is a schematic system diagram showing a steering system of a vehicle having stability control device in accordance with to a first embodiment.

FIG. 1 is a system view showing a steering system of a vehicle having stability control device in accordance with a first embodiment.

The steering device of first embodiment is mainly configured from a steering unit 1, a turning part 2, a backup clutch 3 and a steer-by-wire (SBW) controller 4, and the steering device employing an SBW system in which the steering unit 1 for receiving steering input of the driver and the turning part 2 for turning the left and right front wheels (turnable wheels) 5FL, 5FR are mechanically separated.

The steering unit 1 is provided with a steering wheel 6, a column shaft 7, a reaction force motor 8 and a steering angle sensor 9. The column shaft 7 integrally rotates with the steering wheel 6. The reaction force motor 8 is, e.g., a brushless motor, and is a coaxial motor in which the output shaft is coaxial with the column shaft 7 and outputs a steering reaction force torque to the column shaft 7 in accordance with a command from the SBW controller 4. The steering angle sensor 9 detects the absolute rotation angle of the column shaft 7, i.e., the steering angle of the steering wheel 6.

The turning part 2 is provided with a pinion shaft 11, a steering gear 12, a turning motor 13, and a turning angle sensor 14. The steering gear 12 is a rack-and-pinion steering gear and turns the front wheels 5L, 5R in accordance with the rotation of the pinion shaft 11. The turning motor 13 is, e.g., a brushless motor, and the output shaft is connected to a rack gear 15 via a reduction gear (not shown), the output shaft outputting a turning torque for turning the front wheels 5 to a rack 16 in accordance with a command from the SBW controller 4. The turning angle sensor 14 detects the absolute rotation angle of the turning motor 13. Here, the rotation angle of the turning motor 13 and the turning angle of the front wheels 5 have a constant uniquely established correlation, and the turning angle of the front wheels 5 can therefore be detected from the rotation angle of the turning motor 13. Unless otherwise noted, the turning angle of the front wheels 5 is hereinbelow calculated from the rotation angle of the turning motor 13. The backup clutch 3 is provided between the column shaft 7 of the steering unit 1 and the pinion shaft 11 of the turning part 2, is disengaged to thereby mechanically separate the steering unit 1 and the turning part 2, and is engaged to thereby mechanically connect the steering unit 1 and the turning part 2.

In addition to the angles detected by steering angle sensor 9 and the turning angle sensor 14, the vehicle speed (car body speed) detected by images of the travel path forward of the host vehicle captured by a camera 17 and by a vehicle speed sensor 18 is inputted to the SBW controller 4. The SBW controller 4 has a turning control unit (controller) 19 for controlling the turning angle of the front wheels 5FL, 5FR, a steering reaction force control unit 20 for controlling the steering reaction force torque imparted to the column shaft 7, and an image processing unit 21. The turning control unit 19 generates a command turning angle based on various input information, and outputs the generated command turning angle to an electric current driver (stability control means) 22. The electric current driver 22 controls a command electric current to the turning motor 13 by angle feedback for causing the actual turning angle detected by the turning angle sensor 14 and the command turning angle to match. The steering reaction force control unit 20 generates a command steering reaction force torque based on various input information, and outputs the generated steering reaction force torque to the electric current driver 23. The electric current driver 23 controls the command electric current to the reaction force motor 8 by torque feedback for causing the actual steering reaction force torque estimated from the electric current value of the reaction force motor 8 to match the command steering reaction force torque. The image processing unit 21 recognizes a white line (travel path partition line) to the left and right of the travel lane by edge extraction or other image processing from the images of the travel path forward of the host vehicle captured by the camera 17. Additionally, the SBW controller 4 engages the backup clutch 3 to mechanically link the steering unit 1 and the turning part 2 when the SBW system has failed, and allows movement of the rack 16 in the axial direction by steering of the steering wheel 6. At this time, it is also possible to perform control that corresponds to an electric power steering system for aiding the steering force of the driver using the assist torque of the turning motor 13. A redundant system provided with a plurality of sensors, controllers, and motors may be used in the SBW system. Also, the turning control unit 19 and the steering reaction force control unit 20 may be separate units.

In the first embodiment, stability control and corrective steering reduction control are carried out with the aim of reducing the steering burden and the amount of corrective steering by the driver. Stability control is implemented by two types of feedback (F/B) for the purpose of improving the stability of the vehicle against external disturbances (crosswind, road surface unevenness, ruts, road surface gradient, and the like).

1. Yaw Angle F/B Control

The turning angle is corrected in accordance with the yaw angle, which is the angle formed by the white line and direction of travel of the host vehicle to reduce the yaw angle generated by an external disturbance.

2. Lateral Position F/B Control

The turning angle is corrected in accordance with the distance (lateral position) to the white line to reduce change in the lateral position, which is the integral value of the yaw angle generated by an external disturbance.

Corrective steering reduction control performs three reaction force offset controls for the purpose of improving the stability of the vehicle in relation to steering input of the driver.

1. Reaction Force Offset Control Corresponding to the Lateral Position

The steering reaction force characteristic corresponding to the self-aligning torque is offset in accordance with the lateral position in the direction in which the absolute value of the steering reaction force is increased, and inversion of the sign of the steering torque is suppressed when the driver has performed corrective steering that straddles the neutral position of the steering angle.

2. Reaction Force Offset Control Corresponding to 37

The steering reaction force characteristic corresponding to the self-aligning torque is offset in accordance with the 37 (arrival time to the white line) in the direction in which the absolute value of the steering reaction force is increased, and inversion of the sign of the steering torque is suppressed when the driver has performed corrective steering that straddles the neutral position of the steering angle.

3. Reaction Force Offset Control Corresponding to the Curvature

The steering reaction force characteristic corresponding to the self-aligning torque is offset in accordance with the curvature of the white line in the same sign direction as that of the self-aligning torque, the steering reaction force characteristic reducing the steering effort of the driver during cornering and suppressing a change in the held steering angle in relation to a change in the steering effort.

Turning Control Unit

Figure 2:
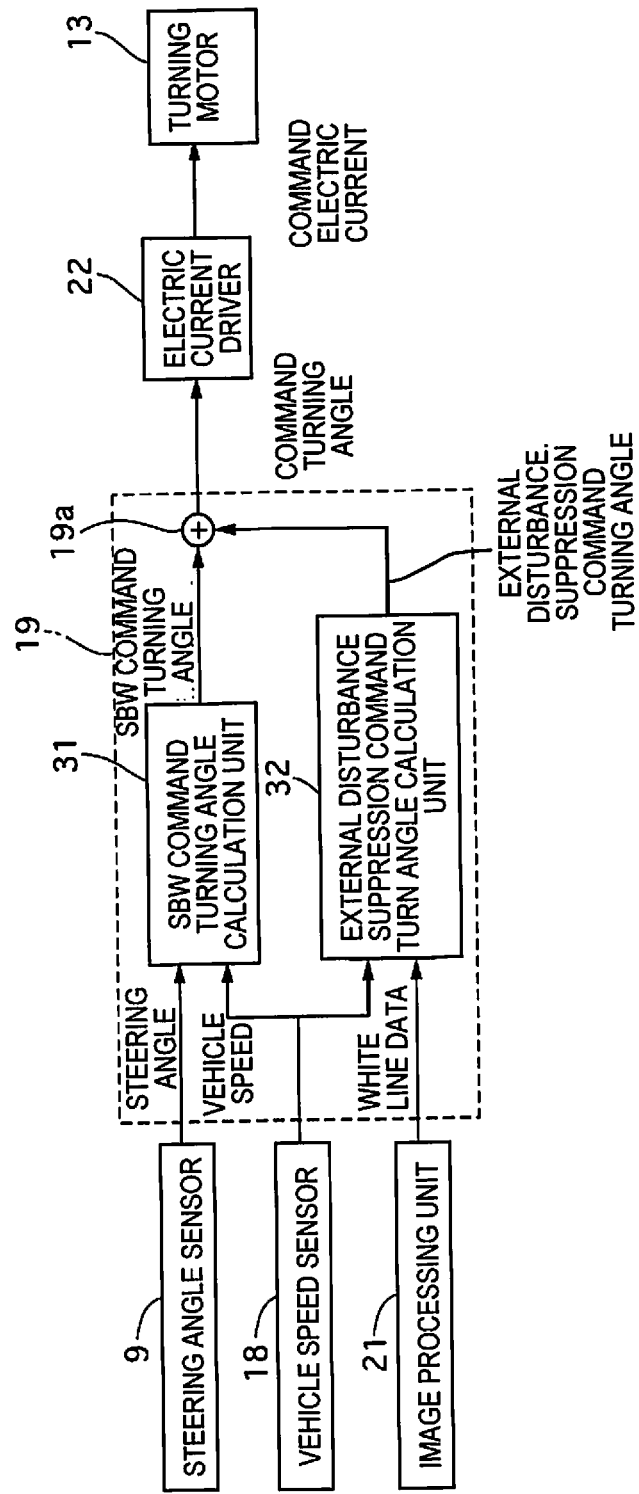
FIG. 2 is a control block diagram of a turning control unit of the stability control device.

FIG. 2 is a control block view of the turning control unit 19. A SBW command turning angle calculation unit 31 computes a SBW command turning angle based on the steering angle and the vehicle speed. An external disturbance suppression command turning angle calculation unit 32 computes an external disturbance suppression command turning angle for correcting the SBW command turning angle in stability control based on the vehicle speed and white line data. The specific details of the external disturbance suppression command turning angle calculation unit 32 are later described.

An adder 19a outputs a value obtained by adding the SBW command turning angle and the external disturbance suppression command turning angle to the electric current driver 22 as the final command turning angle.

Steering Reaction Force Control Unit

Figure 3:
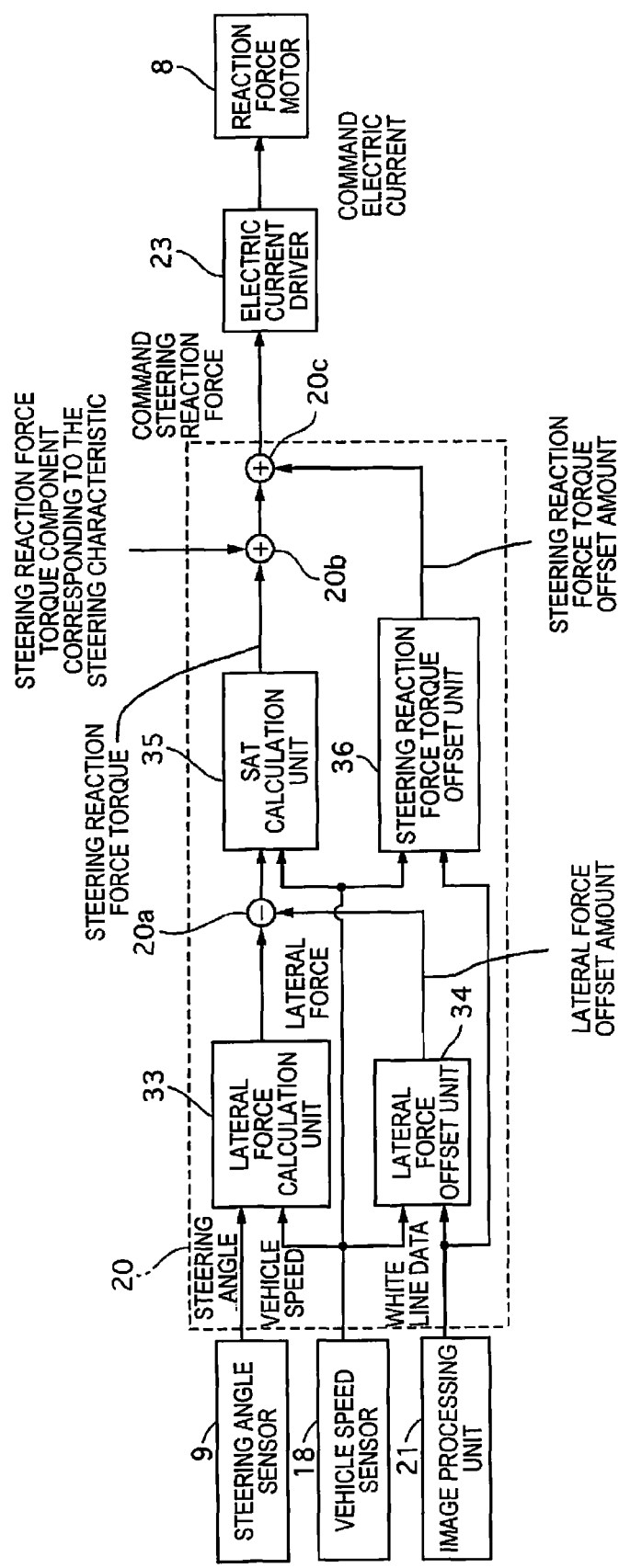
FIG. 3 is a control block diagram of a steering reaction force control unit of the stability control device.

FIG. 3 is a control block view of the steering reaction force control unit 20. A lateral force calculation unit 33 computes tire lateral force based on the steering angle and the vehicle speed with reference to a steering angle-to-lateral force conversion map that represents a relationship between the steering angle and the tire lateral force at each vehicle speed in a conventional steering device obtained by experimentation and the like in advance. The steering angle-to-lateral force conversion map has characteristics in which the tire lateral force is greater as the steering angle is greater, the amount of change in the tire lateral force in relation to the amount of change in the steering angle is greater when the steering angle is less than when the steering angle is greater, and the tire lateral force is reduced as the vehicle speed is increased. The lateral force offset unit 34 computes, based on the vehicle speed and white line data, a lateral force offset amount for offsetting steering reaction force characteristics in reaction force offset control that corresponds to curvature. The specific details of the lateral force offset unit 34 are later described. A subtracter 20a subtracts the lateral force offset amount from the tire lateral force. A SAT calculation unit 35 computes the steering reaction force torque generated by the tire lateral force based on the vehicle speed and the tire lateral force that has been offset by the lateral force offset amount with reference to a lateral force-to-steering reaction force torque conversion map that represents the relationship between the tire lateral force and the steering reaction force torque in a conventional steering device obtained by experimentation or the like in advance. The tire lateral force-to-steering reaction force torque conversion map has characteristics in which the steering reaction force torque is greater as the tire lateral force is greater, the amount of change in the steering reaction force torque in relation to the amount of change in the tire lateral force is greater when the tire lateral force is less than when the tire lateral force is greater, and the steering reaction force torque is reduced as the vehicle speed is increased. These characteristics simulate the reaction force generated in the steering wheel by a self-aligning torque in which the wheels attempt to return to a rectilinear state caused by a road surface reaction force in a conventional steering device. The lateral force calculation unit 33 and the SAT calculation unit 35 correspond to turning state estimation means for estimating the self-aligning torque (turning state of the turning part) based on the steering angle of the steering wheel 6.

An adder 20b adds a steering reaction force torque component (spring term, viscosity term, momentum term) corresponding to the steering characteristics and the steering reaction force torque. The spring term is a component proportional to the steering angle and is calculated by multiplying the steering angle by a predetermined gain. The viscosity term is a component proportional to the steering angular speed and is calculated by multiplying the steering angular speed by a predetermined gain. The momentum term is a component proportional to the steering angular acceleration and is calculated by multiplying the steering angular acceleration by a predetermined gain. A steering reaction force torque offset unit 36 computes the steering reaction force torque offset amount for offsetting the steering reaction force characteristic in reaction force offset control corresponding to the lateral position or the 37 based on the vehicle speed and the image of the travel path forward of the host vehicle. The specific details of the steering reaction force torque offset unit 36 are later described. An adder 20c outputs a value as the final command steering reaction force torque to the electric current driver 23, the value being obtained by adding the steering torque offset amount and the steering reaction force torque to which the steering reaction force torque component corresponding to the steering characteristic has been added.

External Disturbance Suppression Command Turning Angle Calculation Unit

Figure 4:
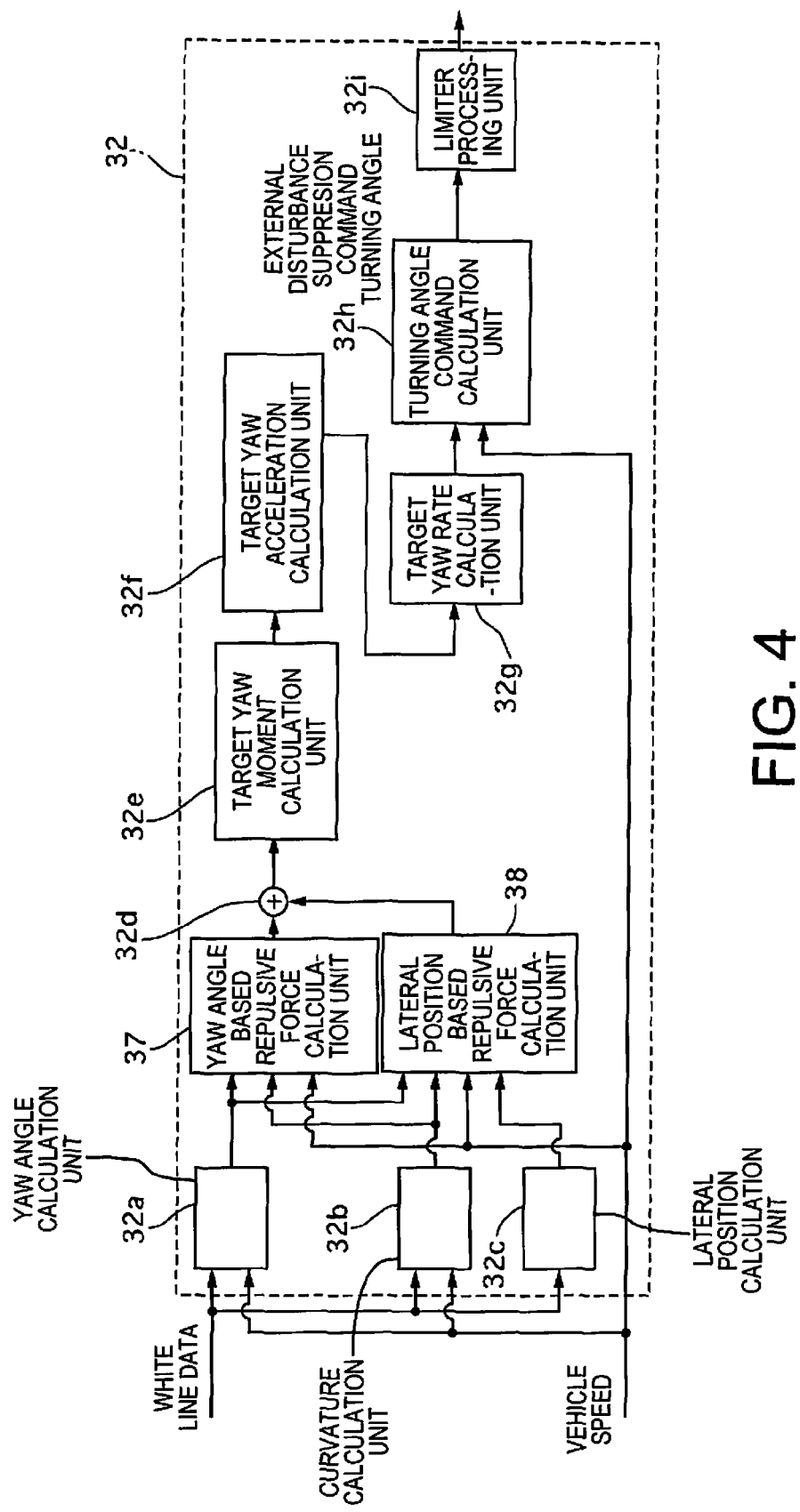
FIG. 4 is a control block diagram of an external disturbance suppression command turning angle calculation unit of the stability control device.

FIG. 4 is a control block view of the external disturbance suppression command turning angle calculation unit 32. A yaw angle calculation unit 32a computes the yaw angle, which is the angle formed by the white line and the traveling direction of the host vehicle at a forward fixation point. The yaw angle at the forward fixation point is an angle formed by the white line and the traveling direction of the host vehicle after a predetermined length of time (e.g., 0.5 seconds). Computing the yaw angle based on an image of the travel path captured by the camera 17 allows the yaw angle to be detected with high precision in a simple manner. A curvature calculation unit 32b computes the curvature of the white line at the forward fixation point. A lateral position calculation unit 32c computes the distance to the white line at the forward fixation point. The yaw angle based repulsive force calculation unit (yaw-angle-suppressing turning amount calculation means) 37 computes the repulsive force of the vehicle for reducing the yaw angle generated by an external disturbance in yaw angle FB control based on the yaw angle, the curvature, and the vehicle speed. The specific details of the yaw angle based repulsive force calculation unit 37 are later described.

The lateral position based repulsive force calculation unit (lane-center-returning turning amount calculation means) 38 computes the repulsive force of the vehicle for reducing change in the lateral position generated by an external disturbance in the lateral position FB control based on the yaw angle, the curvature, and the distance to the white line at the forward fixation point. The specific details of the lateral position based repulsive force calculation unit 38 are later described. An adder 32d adds the reaction force corresponding to the yaw angle and the reaction force corresponding to the lateral position to compute the reaction force in the lateral direction. A target yaw moment calculation unit 32e computes a target yaw moment based on the reaction force in the lateral direction, the wheel base (distance between axles), and the rear wheel axle load and front wheel axle load. Specifically, the value obtained by multiplying wheel base and the ratio of the rear wheel axle load in relation to the vehicle weight (front wheel axle load+rear wheel axle load) is used as the target yaw moment in relation to the reaction force in the lateral direction. A target yaw acceleration calculation unit 32f multiplies the target yaw moment and the yaw moment of inertia coefficient to compute the target yaw acceleration. A target yaw rate calculation unit 32g multiplies the time headway and the target yaw acceleration to compute the target yaw rate.

A command turning angle calculation unit 32h computes the external disturbance suppression command turning angle $\delta_{st}^*$ with reference to the following formula based on the target yaw rate $\phi^*$, the wheelbase WHEEL_BASE, the vehicle speed V, and the vehicle characteristics speed vCh. As used herein, the vehicle characteristics speed vCh is a parameter in a known "Ackermann formula" and represents the self-steering characteristic of a vehicle.

$$\delta_{st}^* = (\phi^* \times \text{WHEEL\_BASE} \times (1+(V/vCh)^2) \times 180)/(V \times M\_PI)$$

where M_PI is a predetermined coefficient.

A limiter processing unit 32*i* limits the upper limit of the change rate and the maximum value of the external disturbance suppression command turning angle $\delta_{st}*$. The maximum value is the turning angle range (e.g., 0.2° left and right) of the front wheels 5FL, 5FR corresponding to the range of play when the steering angle of the steering wheel 6 is in the angle range (e.g., 3° left and right) of play near the neutral position in a conventional steering device (in which the steering unit and the turning part are mechanically connected).

Figure 5:
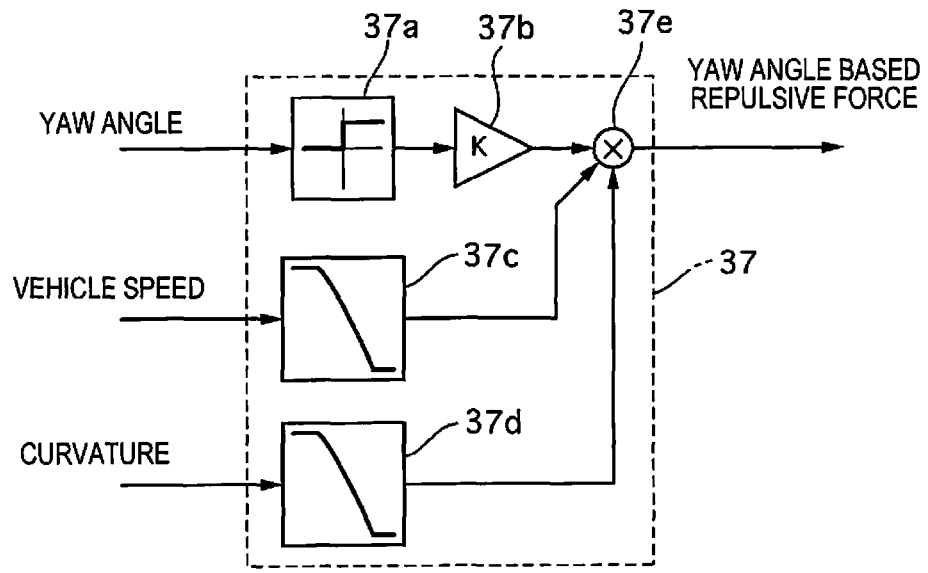
FIG. 5 is a control block diagram of a yaw angle based reaction force calculation unit of the stability control device.

FIG. 5 is a control block view of the yaw angle based repulsive force calculation unit 37. An upper/lower limit limiter 37*a* limits the upper and lower limits of yaw angle. The upper/lower limit limiter sets a predetermined value or higher that is capable of suppressing an external disturbance, and a value that is less than a value at which the vehicle becomes vibrational and a value generated by steering of the driver (e.g., 1°) when the yaw angle is a positive value (a positive yaw angle occurs when the white line and an extended line in the traveling direction of the host vehicle intersect). The upper/lower limit limiter sets the value to 0 when the yaw angle is negative. A yaw angle F/B gain multiplication unit 37*b* multiplies the limited yaw angle by the yaw angle F/B gain. The yaw angle F/B gain is a predetermined value or higher that is capable of ensuring responsiveness while avoiding an insufficient amount of control, and is less than a value at which the vehicle becomes vibrational and a value at which the driver senses displacement from neutral between the steering angle and the turning angle.

A vehicle speed correction gain multiplication unit 37*c* multiplies the vehicle speed by a vehicle speed correction gain. The vehicle speed correction gain is characteristic in being at a maximum value in the range of 0 to 70 km/h, gradually decreasing in the range of 70 to 130 km/h, and being at a minimum value (0) in the range of 130 km/h and higher. A curvature correction gain multiplication unit 37*d* multiplies the curvature by a curvature correction gain. The curvature correction gain is characteristic in being smaller as the curvature increases, and sets an upper limit and a lower limit (0). A multiplier 37*e* multiplies the outputs of the yaw angle F/B gain multiplication unit 37*b* and each of the vehicle speed correction gain multiplication unit 37*c* and the curvature correction gain multiplication unit 37*d* to determine the reaction force corresponding to the yaw angle.

Figure 6:
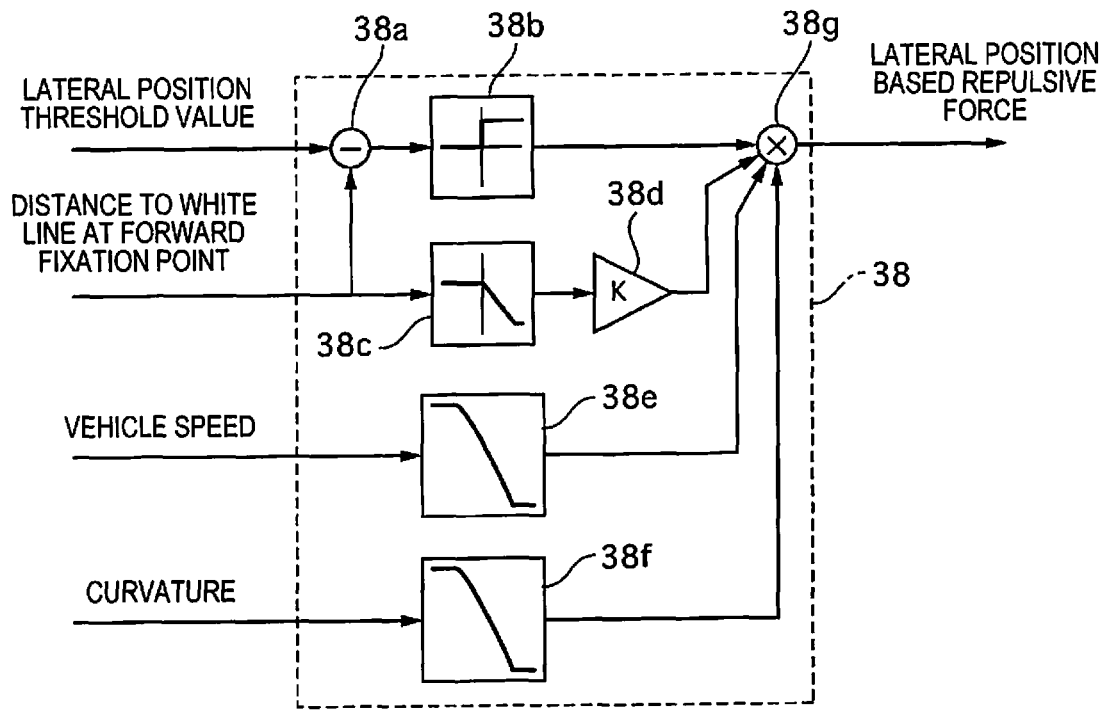
FIG. 6 is a control block diagram of a lateral position based repulsive force calculation unit of the stability control device.

FIG. 6 is a control block view of the lateral position based repulsive force calculation unit 38. A subtracter 38*a* subtracts the distance to the white line at a forward fixation point from the lateral position threshold value (e.g., 90 cm) set in advance to determine the lateral position deviation. An upper/lower limit limiter 38*b* limits the upper and lower limits of the lateral position deviation. The upper/lower limit limiter sets a predetermined positive value when the lateral position deviation is a positive value. The upper/lower limit limiter sets the value to 0 when the lateral position deviation is negative. A distance correction gain multiplication unit 38*c* multiplies the distance to the white line at the forward fixation point by a distance correction gain. The distance correction gain sets a lower limit, the distance correction gain being characterized in being a maximum value when the distance to the white line is at a predetermined value or less and in being a lower value as the distance increases when the predetermined value has been exceeded.

A lateral position F/B gain multiplication unit 38*d* multiplies the distance to the white line as corrected by the distance correction gain multiplication unit 38*c* by a lateral position F/B gain. The lateral position F/B gain is a predetermined value or higher that is capable of ensuring responsiveness while avoiding an insufficient amount of control, and is less than a value at which the vehicle becomes vibrational and a value at which the driver senses displacement from neutral, and is furthermore set to a lower value than the yaw angle F/B gain of the yaw angle F/B gain multiplication unit 37*b*. A vehicle speed correction gain multiplication unit 38*e* multiplies the vehicle speed by a vehicle speed correction gain. The vehicle speed correction gain is characteristic in being a maximum value in the range of 0 to 70 km/h, gradually decreasing in the range of 70 to 130 km/h, and being at a minimum value (0) in the range of 130 km/h and higher. A curvature correction gain multiplication unit 38*f* multiplies the curvature by a curvature correction gain. The curvature correction gain is characteristic in being smaller as the curvature increases, and sets an upper limit and a lower limit (0). A multiplier 38*g* multiplies the outputs of the lateral position F/B gain multiplication unit 38*d* and each of the vehicle speed correction gain multiplication unit 38*e* and the curvature correction gain multiplication unit 38*f* to determine reaction force corresponding to the lateral position.

Stability Control Effect

Figure 7:
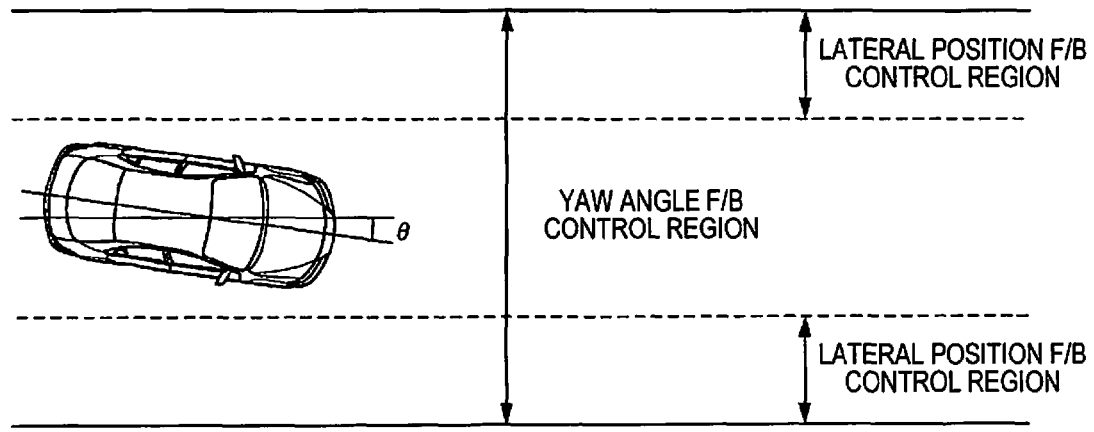
FIG. 7 is a diagram showing the control region of the yaw angle F/B control and the lateral position F/B control.

In the first embodiment, yaw angle F/B control for reducing the yaw angle generated by an external disturbance and lateral position F/B control for reducing change in the lateral position, which is the integral value of the yaw angle generated by the external disturbance, are carried out as stability control. The yaw angle F/B control is carried out regardless of the lateral position when a yaw angle has been generated, and the lateral position F/B control is carried out when the distance to the white line is at a predetermined lateral position threshold value (90 cm) or less. In other words, the center vicinity of the travel lane is a dead zone of lateral position F/B control. The control region of both F/B controls is shown in FIG. 7. $\phi$ is the yaw angle.

Figure 8:
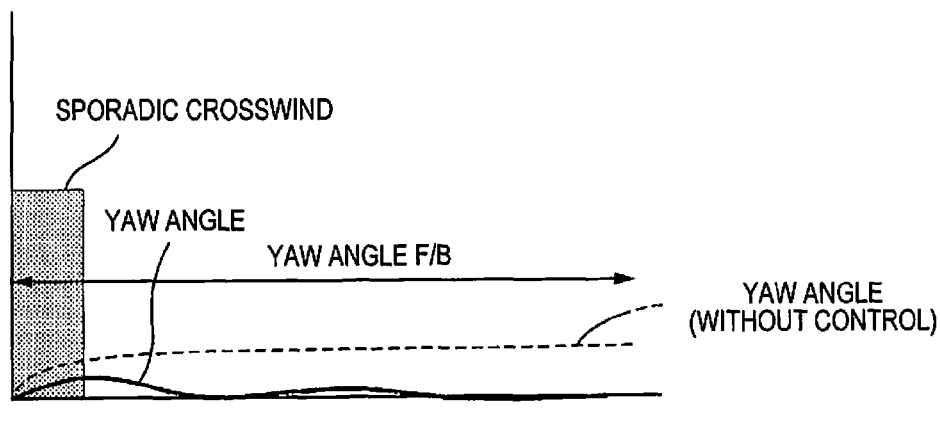
FIG. 8 is a timing chart showing change in the yaw angle when the vehicle traveling on a straight road of an expressway undergoes sporadic crosswinds.

FIG. 8 is a timing chart showing change in the yaw angle when the vehicle traveling on a straight road of an expressway undergoes sporadic crosswinds, and the vehicle is assumed to be traveling in the center vicinity of the travel lane. When the vehicle undergoes a sporadic crosswind and a yaw angle is generated in yaw angle F/B control, the reaction force corresponding to the yaw angle is computed, an external disturbance suppression command turning angle for obtaining the reaction force is determined, and a SBW command turning angle based on the steering angle and the vehicle speed is corrected. When the vehicle is traveling along a travel lane, on a straight road in particular, the yaw angle is zero because the direction of the white line and the traveling direction of the host vehicle match. In other words, in the yaw angle F/B control of the first embodiment, the generated yaw angle is deemed to be caused by an external disturbance, and reducing the yaw angle makes it possible to ensure improvement in stability of the vehicle in relation to an external disturbance during straight-line travel in particular and allows the corrective steering amount of the driver to be reduced.

Conventionally, a device for imparting turning torque to a steering system to suppress external disturbance is known in a conventional steering device as a device for suppressing the effect of a crosswind or other external disturbance on vehicle behavior. A device for imparting to the steering wheel a turning reaction force component for urging a turn so as to suppress an external disturbance is known in a SBW system. However, in these conventional turning devices, an unpleasant sensation is experienced by the driver because fluctuation occurs in the steering reaction force. In contrast thereto, in view of the fact that the steering wheel 6 and the front wheels 5L, 5R can be controlled independently from each other, which is a characteristic of a SBW system in which the steering wheel 6 and the front wheels 5L, 5R are mechanically separated, in stability control that includes yaw angle F/B control of the first embodiment, the turning angle of the front wheels 5L, 5R is controlled based on a command turning angle obtained by adding the SBW command turning angle that corresponds to the steering angle and the vehicle speed, and the external disturbance suppression command turning angle that corresponds to the yaw angle, and meanwhile the tire lateral force is estimated based on the steering angle and the vehicle speed, and the steering reaction force is controlled based on the command steering reaction force that corresponds to the vehicle speed and the estimated tire lateral force. In other words, it is not required that a steering reaction force component for urging a turn for suppressing an external disturbance be imparted in order to give a turning angle of the external disturbance-suppressing portion directly to the front wheels 5L, 5R. Furthermore, imparting a steering reaction force that corresponds to the tire lateral force estimated from the turning angle allows an unpleasant sensation experienced by the driver to be reduced because the fluctuation of the tire lateral force caused by a turn for suppressing an external disturbance is not reflected in the steering reaction force. In a conventional SBW system, the tire lateral force is estimated from the turning angle and/or the rack shaft force detected by a sensor, and a steering reaction force corresponding to the estimated tire lateral force is imparted. Accordingly, fluctuation in the tire lateral force caused by a turn for suppressing an external disturbance is not always reflected in the steering reaction force and the driver experiences an unpleasant sensation. In the first embodiment, only the tire lateral force caused by a turn for suppressing an external disturbance is reflected in the steering reaction force, and the unpleasant sensation imparted to the driver can be reduced because the steering reaction force does not fluctuate due to a turn for suppressing an external disturbance.

Here, when the turning angle of the external disturbance-suppressing portion is given directly to the front wheels 5L, 5R, the neutral displacement between the steering angle and the turning angle becomes a problem, and in the first embodiment, the external disturbance suppression command turning angle is set to a turning angle range (e.g., 0.2° left and right) of the front wheels 5FL, 5FR corresponding to the range of play when the steering wheel 6 is in the angle range (e.g., 3° left and right) of play near the steering angle neutral position in a conventional steering device. The occurrence of a yaw angle caused by an external disturbance is more considerable during rectilinear travel than during cornering, and during rectilinear travel, the steering angle is positioned in the vicinity of the steering angle neutral position. In other words, correction of the turning angle by yaw angle FB control is mostly carried out in the vicinity of the steering angle neutral position, and suppressing the amount of neutral displacement between the steering angle and the turning angle that accompanies imparting of the external disturbance suppression command turning angle to the steering play range makes it possible to suppress an unpleasant sensation that accompanies neutral displacement. Because the external disturbance suppression command turning angle is limited to 0.2° left and right, it is possible to change the traveling direction of the host vehicle to a desired direction using the steering inputted by the driver, even when stability control is being carried out. In other words, because the amount of correction of the turning angle by the external disturbance suppression command turning angle is low in relation to the amount of change in the turning angle caused by the steering input of the driver, it is possible to improve the stability of a vehicle in relation to an external disturbance without interfering with the steering of the driver.

Conventionally known ways of controlling movement of the vehicle in the lateral direction are lane deviation prevention control for imparting a yaw moment to the vehicle to avoid deviation when the vehicle is detected to be tending to deviate from the travel lane, and lane-maintenance control for imparting a yaw moment to the vehicle so that the vehicle will travel in the center vicinity of the travel lane. However, lane deviation prevention control involves a threshold value for control intervention, and because control does not operate in the center vicinity of the travel lane, vehicle stability in relation to an external disturbance cannot be ensured. Also, because control intervention is carried out due to the threshold value even when the driver desires to bring the vehicle to the edge of the travel lane, the driver may experience annoyance. On the other hand, lane-maintenance control involves a target position (target line), and although vehicle stability in relation to an external disturbance can be ensured, it is not possible to travel along a line that departs from the target line. Additionally, control is disengaged when it is assessed that the steering wheel has been released when the driver has reduced the gripping force on the steering wheel. Therefore, the driver must grip the steering wheel with a fixed force or greater, and the steering burden on the driver is high. In contrast, the yaw angle F/B control of the first embodiment does not involve a threshold value for control intervention, and it is therefore possible to constantly ensure stability with seamless control in relation to an external disturbance. Furthermore, the yaw angle F/B control does not involve a target position, and the driver is therefore able to cause the vehicle to travel along a desired line. Additionally, control is not disengaged even when the steering wheel 6 is held lightly, and the steering burden on the driver can therefore be reduced.

Figure 9:
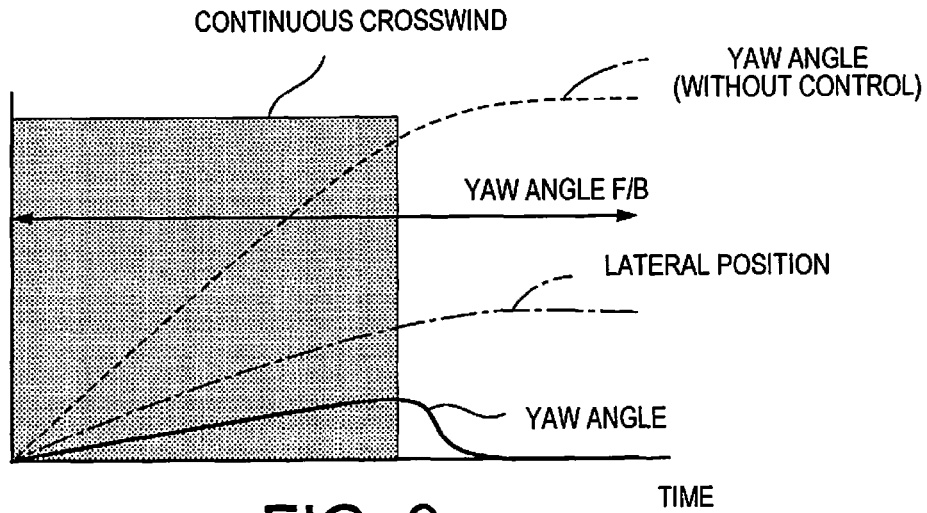
FIG. 9 is a timing chart showing yaw angle change and lateral position change when lateral position F/B control is not carried out when the vehicle undergoes a continuous crosswind while traveling on a straight road of an expressway.

FIG. 9 is a timing chart showing yaw angle change and lateral position change when lateral position F/B control is not carried out when the vehicle undergoes a continuous crosswind while traveling on a straight road of an expressway, and the vehicle is assumed to be traveling in the center vicinity of the travel lane. When the vehicle undergoes a continuous crosswind and a yaw angle is generated, the yaw angle is reduced by yaw angle F/B control, but the vehicle undergoes a continuous external disturbance and drifts laterally. This is due to the fact that yaw angle F/B control reduces a yaw angle and does not correct the turning angle when the yaw angle is zero, and therefore, change in the lateral position, which is an integral value of the yaw angles generated by the external disturbance, cannot be directly reduced. Setting the reaction force corresponding to the yaw angle to a high value makes it possible to indirectly suppress changes in the lateral position (suppress an increase in the integral value of the yaw angles), but because the maximum value of the external disturbance suppression command turning angle is limited to 0.2° left and right so that an unpleasant sensation is experienced by the driver, it is difficult to effectively suppress lateral drift of the vehicle using only yaw angle F/B control. The yaw angle F/B gain for determining the reaction force corresponding to the yaw angle must furthermore cause the yaw angles to converge before the driver perceives a change in the yaw angle, and because the vehicle becomes vibrational without this convergence even though the value is set as high as possible, the yaw angle multiplied by the yaw angle F/B gain is limited to an upper limit (1°) or less by the upper/lower limit limiter 37a. In other words, the reaction force corresponding to the yaw angle is a reaction force that corresponds to a smaller yaw angle than the actual yaw angle, and from this aspect as well, it is apparent that it is difficult to effectively suppress lateral drift of the vehicle using only yaw angle F/B control.

Figure 10:
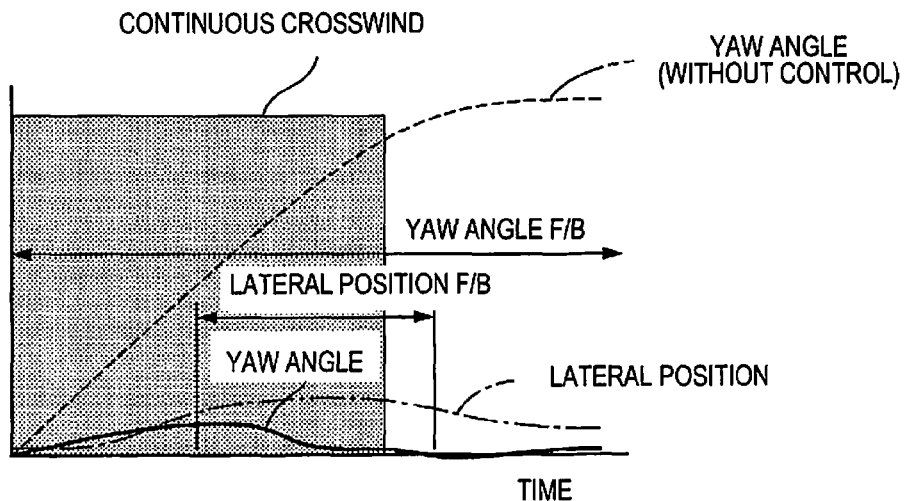
FIG. 10 is a timing chart showing yaw angle change and lateral position change when lateral position F/B control has been carried out when the vehicle undergoes a continuous crosswind while traveling on a straight road of an expressway.

In view of the above, the stability control of the first embodiment introduces lateral position F/B control to suppress lateral drift of the vehicle due to a steady external disturbance. FIG. 10 is a timing chart showing yaw angle change and lateral position change when lateral position F/B control has been carried out when the vehicle undergoes a continuous crosswind while traveling on a straight road of an expressway. When a vehicle traveling in the center vicinity of a travel lane undergoes a continuous crosswind and drifts laterally, and the distance to the white line reaches a lateral position threshold value or less in lateral position F/B control, a reaction force corresponding to the change in lateral position (which is approximately equal to the integral value of the yaw angle) is computed. The external disturbance suppression command turning angle calculation unit 32 computes the external disturbance suppression command turning angle, which is based on the reaction force in the lateral direction obtained by adding the reaction force that corresponds to the lateral position and the reaction force that corresponds to the yaw angle, and corrects the SBW command turning angle. That is to say, lateral position F/B control corrects the SBW command turning angle using the external disturbance suppression command turning angle that corresponds to the lateral position, and it is therefore possible to directly reduce the change in lateral position caused by a steady external disturbance and lateral drift of the vehicle can be suppressed. In other words, the travel position of the vehicle in which yaw angle F/B control is carried out can be returned to the center vicinity of the travel lane, which is the dead zone of lateral position F/B control.

As described above, stability control of the first embodiment reduces the change in yaw angle caused by a transient external disturbance using yaw angle F/B control, and reduces the integral value of the yaw angle (change in the lateral position) caused by a steady external disturbance using lateral position F/B control, thereby making it possible to improve stability of the vehicle in relation to both transient and steady external disturbances. Furthermore, stability control of the first embodiment limits vehicle behavior produced by the control (imparted by the external disturbance suppression command turning angle) to a level not perceived by the driver and to a level that does not interfere with changes in the vehicle behavior generated by driver steering, and because change in the self-aligning torque produced by the control is not reflected in the steering reaction force, stability control can be carried out without the driver being aware that stability control is being carried out. It is thereby possible to simulate behavior in a vehicle having vehicle body specifications that have excellent stability in relation to external disturbances. The lateral position F/B gain for determining the reaction force that corresponds to the lateral position in lateral position F/B control is set to a lower value than the yaw angle F/B gain. As described above, this is due to the fact that because the yaw angle F/B control must cause the yaw angles to converge before the driver perceives a change in the yaw angle caused by a transient external disturbance, there is a need for high responsiveness, and in contrast, lateral position F/B control must stop an increase in change in the lateral position, time is required for the lateral position to change due to accumulation of the yaw angle integral values, and the responsiveness on the level of yaw angle F/B control is therefore not required. Additionally, even if the lateral position F/B gain is set high, the amount of control greatly fluctuates in accordance with the magnitude of the external disturbance, and the driver would experience an unpleasant sensation.

Lateral Force Offset Unit

Figure 11:
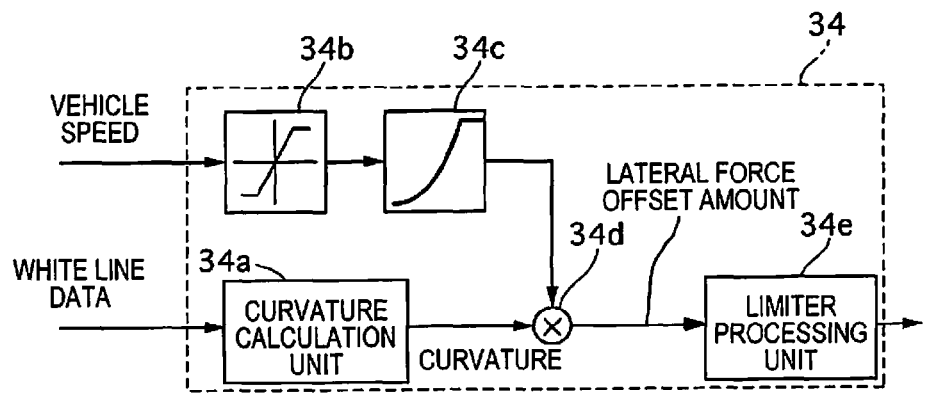
FIG. 11 is a control block diagram of the lateral force offset unit of the stability control device.

FIG. 11 is a control block view of the lateral force offset unit 34. A curvature calculation unit 34a computes the curvature of the white line at the forward fixation point. An upper/lower limit limiter 34b limits the upper and lower limits of vehicle speed. A SAT gain calculation unit 34c computes the SAT gain that corresponds to the vehicle speed based on the limited vehicle speed. The SAT gain sets an upper limit, the SAT gain being characteristic in that the gain is greater as the vehicle speed is higher. A multiplier 34d multiplies the curvature by the SAT gain to determine the lateral force offset amount. A limiter processing unit 34e limits the maximum value of the lateral force offset amount and the upper limit of the rate of change. For example, the maximum value is 1,000 N, and the upper limit of the rate of change is 600 N/s.

Effect of Reaction Force Offset Control Corresponding to the Curvature

Figure 12:
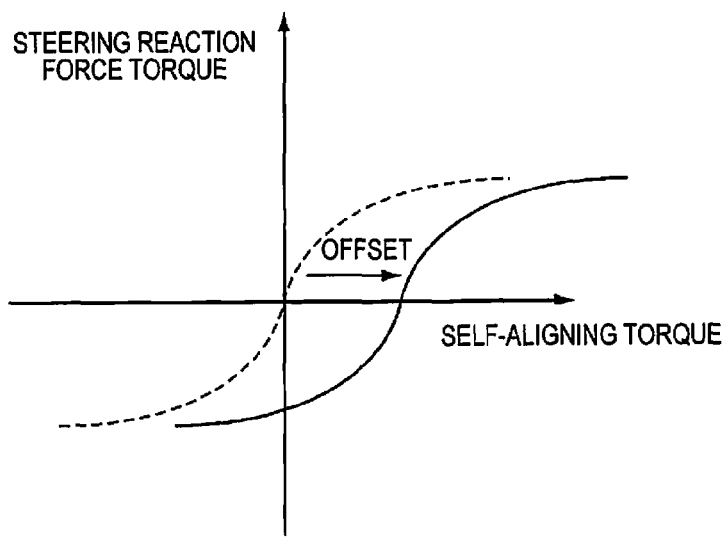
FIG. 12 is a diagram showing the state in which the steering reaction force characteristic representing the steering reaction force torque that corresponds to the self-aligning torque has been offset in the same direction as the self-aligning torque.

Reaction force offset control corresponding to the curvature determines a lateral force offset amount which is greater as the curvature of the white line is greater, and subtracts the lateral force offset amount from the tire lateral force. The steering reaction force torque that corresponds to the tire lateral force computed by the SAT calculation unit 35, i.e., the steering reaction force characteristic representing the steering reaction force torque that corresponds to the self-aligning torque is offset in the same sign direction as that of the self-aligning torque in commensurate fashion to a greater curvature of the white line, as shown in FIG. 12. FIG. 12 shows the case of a right curve, and when the curve is a left curve, the offset occurs in the direction opposite of that in FIG. 12.

Conventionally, in a SBW system in which the steering angle and the turning angle are mechanically separated, the steering angle reaction force characteristic for simulating a steering reaction force that corresponds to the self-aligning torque in a conventional steering device is set and a steering reaction force is imparted to the steering wheel based on the steering reaction force characteristic. In this case, the relationship between the steering angle of the steering wheel and the steering torque of the driver is shown as characteristic A in FIG. 13. In other words, the absolute value of the steering torque increases as the absolute value of the steering angle increases, and the amount of change in the steering torque in relation to the amount of change in the steering angle increases more greatly when the absolute value of the steering angle is smaller than when the absolute value of the steering angle is greater.

Figure 13:
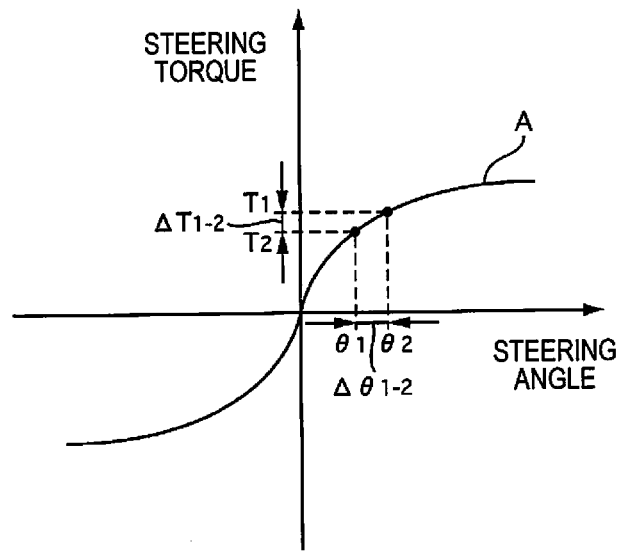
FIG. 13 is a characteristics diagram showing the relationship between the steering angle of the steering wheel and the steering torque of the driver.

Here, the case in which the driver changes the held steering torque in order to make a course correction during cornering will be considered. In FIG. 13, when the held steering torque is reduced to $T_2$ from the state in which the driver has held the steering angle $\theta_1$ at the held steering torque $T_1$, the steering angle becomes $\theta_2$ and the steering angle of the front wheels 5L, 5R is reduced by the decrease in the steering angle. In this case, the steering angle fluctuates considerably in relation to the change in held steering torque as the curvature of the curve increases due to the steering reaction force characteristic in the above-described SBW system. In other words, there is a problem in that course correction is difficult because the sensitivity of the vehicle in relation to the steering torque increases as the curvature of the curve increases.

Figure 14:
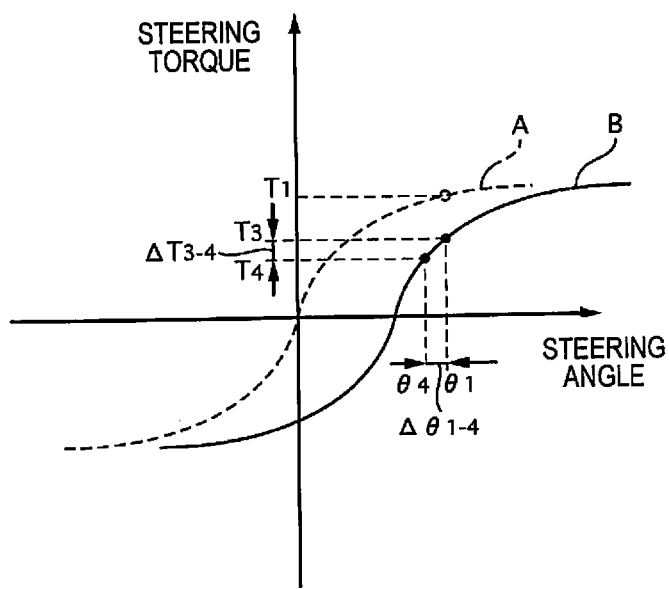
FIG. 14 is a diagram showing the state in which the characteristic showing the relationship between the steering angle of the steering wheel and the steering torque of the driver has changed due to the steering reaction force characteristic being offset in the same direction as the self-aligning torque, the steering reaction force characteristic representing the steering reaction force torque that corresponds to the self-aligning torque.

In contrast, the curvature based reaction force offset control of the first embodiment offsets, in the same sign direction as that of the self-aligning torque, the steering reaction force characteristic representing the steering reaction force torque that corresponds to the self-aligning torque in commensurate fashion to a greater curvature of the white line, whereby the characteristic that represents the relationship between the steering angle and the turning angle is offset in the same sign direction as the steering angle and changes from characteristic A to characteristic B, as shown in FIG. 14. Because the amount of change in the steering angle in relation to the amount of change in the held steering torque thereby decreases as the curvature of the white line increases, the reduction amount $\Delta\theta_{1\text{-}4}$ of the steering angle is less than that of a conventional reduction amount $\Delta\theta_{1\text{-}2}$, even when the driver reduces the held steering torque to $T_4$ and the reduction amount $\Delta T_{3\text{-}4}$ is the same as the conventional reduction amount $\Delta T_{1\text{-}2}$ shown in FIG. 13. In other words, because the fluctuation in the steering angle in relation to the change in held steering torque can be reduced in commensurate fashion of a higher curvature of the curve and the sensitivity of the vehicle in relation to the steering torque can be reduced, change in the behavior of the vehicle can be attenuated and it is possible to facilitate a course correction made by the driver. Also, because the held steering torque $T_3(<T_1)$ for maintaining the steering angle $\theta_1$ can be reduced more greatly than conventional techniques, it is possible to reduce the steering burden on the driver during cornering.

There is a conventionally known technique in which the trend in the steering reaction force characteristic is reduced as the curvature of the white line is increased for the purpose of reducing the steering burden of the driver during cornering. However, with this conventional technique, fluctuation of the steering angle in relation to the change in held steering torque is greater as the curvature increases, and the sensitivity of the vehicle in relation to the steering torque is therefore increased. In other words, offsetting the steering reaction force characteristic in the same direction as the self-aligning torque in accordance with the curvature of the white line makes it possible to both facilitate course correction and reduce the steering burden of the driver during cornering.

Steering Reaction Force Torque Offset Unit

Figure 15:
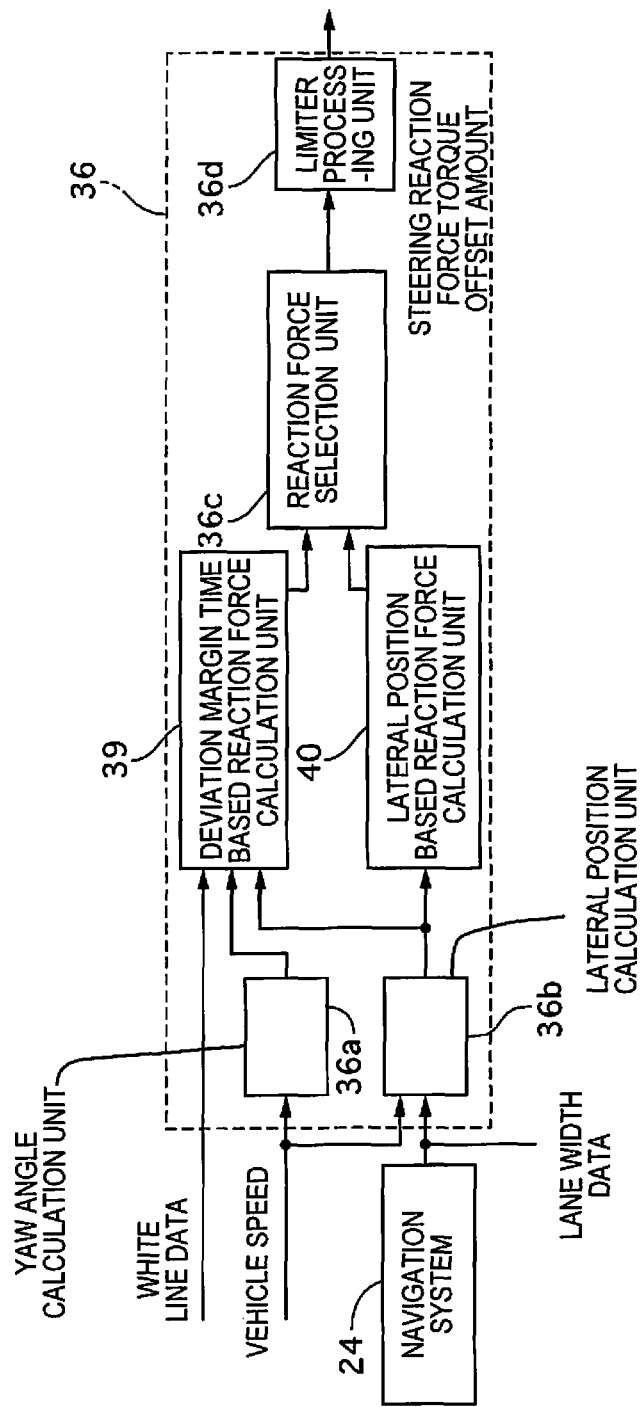
FIG. 15 is a control block diagram of the steering reaction force torque offset unit 36.

FIG. 15 is a control block view of the steering reaction force torque offset unit 36. A yaw angle calculation unit 36a computes the yaw angle at the forward fixation point. Computing the yaw angle based on an image of the travel path captured by the camera 17 allows the yaw angle to be detected in a simple manner with high precision. A lateral position calculation unit 36b computes the lateral position in relation to the left and right white lines at the forward fixation point and the lateral position to the left and right white lines at the current position. Here, the lateral position calculation unit 36b switches the lateral position in relation to the left and right white lines in the current position when the host vehicle has crossed the white line and moved to an adjacent travel lane, i.e., when a lane change has been carried out. In other words, the lateral position in relation to the left white line prior to arriving at the white line is used as the lateral position in relation to the right white line after arriving at the white line, and the lateral position in relation to the right white line prior to arriving at the white line is used as the lateral position in relation to the left white line after arriving at the white line. When a lane change has been made to a travel lane having a different lane width, the lane width $W_2$ of the travel lane after the lane change is multiplied by the lateral position switched for a value $W_2/W_1$ to correct the lateral position, the value $W_2/W_1$ being obtained by dividing the lane width $W_2$ of the travel lane after the lane change by the lane width $W_1$ of the travel lane prior to the lane change. Here, the lane width information of the travel lanes is acquired from a navigation system 24. A 37 based reaction force calculation unit 39 computes a reaction force that corresponds to the 37 based on the vehicle speed, the yaw angle, and the lateral position in relation to the left and right white lines at the forward fixation point. The details of the 37 based reaction force calculation unit 39 are later described. A lateral position based reaction force calculation unit 40 computes a reaction force that corresponds to the lateral position based on the lateral position in relation to the left and right white lines at the current position. The specific details of the lateral position based reaction force calculation unit 40 are later described. A reaction force selection unit 36c selects, as the offset amount of the steering reaction force torque, the larger absolute value of the reaction force that corresponds to the 37 and the reaction force that corresponds to the lateral position. A limiter processing unit 36d limits the upper limit of the rate of change and the maximum value of the steering reaction force torque offset amount. For example, the maximum value is 2 Nm, and the upper limit of the rate of change is 10 Nm/s.

Figure 16:
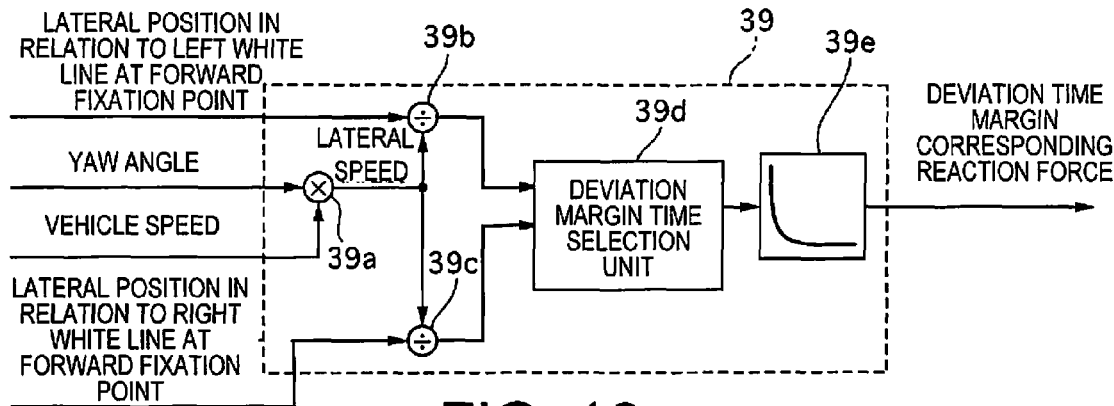
FIG. 16 is a control block diagram of the 37 based reaction force calculation unit of the stability control device.

FIG. 16 is a control block view of the 37 based reaction force calculation unit 39. A multiplier 39a multiplies the vehicle speed by the yaw angle to determine the lateral speed of the vehicle. A divider 39b divides the lateral position in relation to the left white line at a forward fixation point by the lateral speed to determine the 37 in relation to the left white line. A divider 39c divides the lateral position in relation to the right white line at a forward fixation point by the lateral speed to determine the 37 in relation to the right white line. A 37 selection unit 39d selects the shorter 37 in relation to the left and right white lines to be the 37. A 37 based reaction force calculation unit 39e computes the reaction force that corresponds to the 37 based on the 37. The reaction force that corresponds to the 37 is inversely proportional (proportional to the reciprocal of the 37) to the 37, and is characteristic in being roughly zero at three seconds or more.

Figure 17:
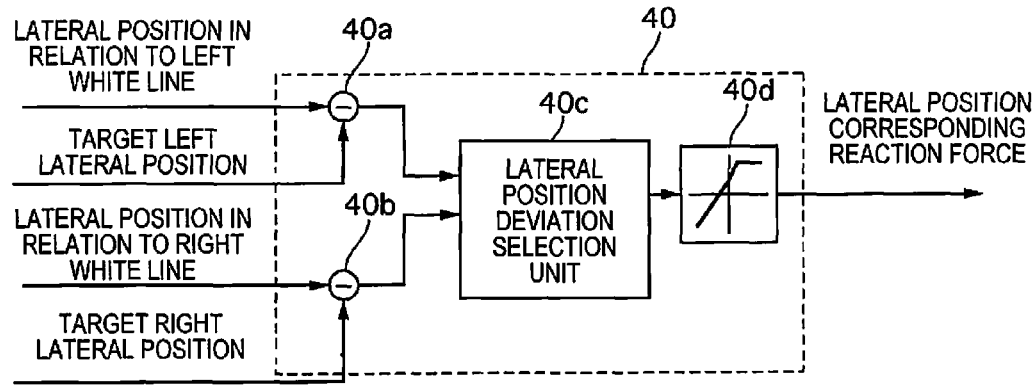
FIG. 17 is a control block diagram of the lateral position based reaction force calculation unit of the stability control device.

FIG. 17 is a control block view of the lateral position based reaction force calculation unit 40. A subtracter 40a subtracts the lateral position in relation to the left lane from a target left lateral position (e.g., 90 cm) set in advance to determine the lateral position deviation in relation to the left lane. A subtracter 40b subtracts the lateral position in relation to the right lane from a target right lateral position (e.g., 90 cm) set in advance to determine the lateral position deviation in relation to the right lane. A lateral position deviation selection unit 40c selects as the lateral position deviation the greater of the lateral position deviations in relation to the left and right lanes. A lateral position deviation based reaction force calculation unit 40d computes the reaction force that corresponds to the lateral position based on the lateral position deviation. The reaction force that corresponds to the lateral position sets the upper limit and is characteristic in being greater as the lateral position deviation is greater.

Effect of Lateral Position Based Reaction Force Offset Control

Figure 18:
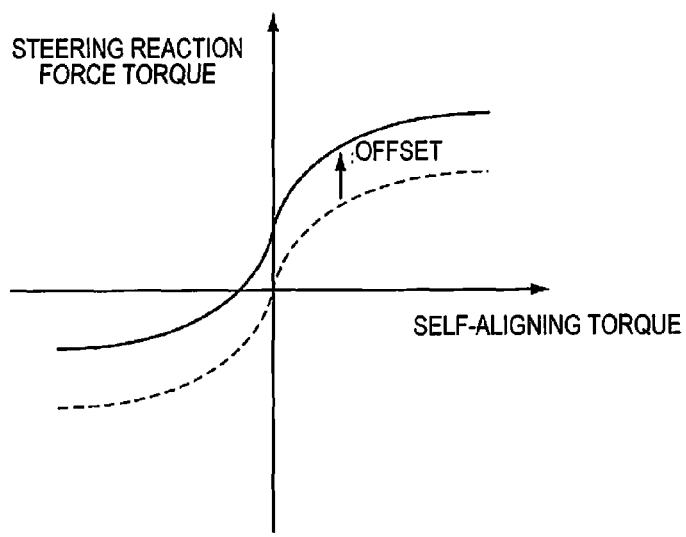
FIG. 18 is a diagram showing the state in which the steering reaction force characteristic representing the steering reaction force torque that corresponds to the self-aligning torque has been offset in the direction in which the absolute value of the steering reaction force torque increases.

Lateral position based reaction force offset control adds to the steering reaction force torque the reaction force that corresponds to the lateral position as the steering reaction force torque offset amount. The steering reaction force characteristic representing the steering reaction force torque that corresponds to the self-aligning torque is thereby offset more greatly in the direction in which the absolute value of the steering reaction force torque increases in commensurate fashion of a shorter distance to the white line, as shown in FIG. 18. FIG. 18 shows the case of proximity to the right lane, and the offset occurs in the direction opposite of that in FIG. 18 in the case of proximity to the left lane.

Figure 19:
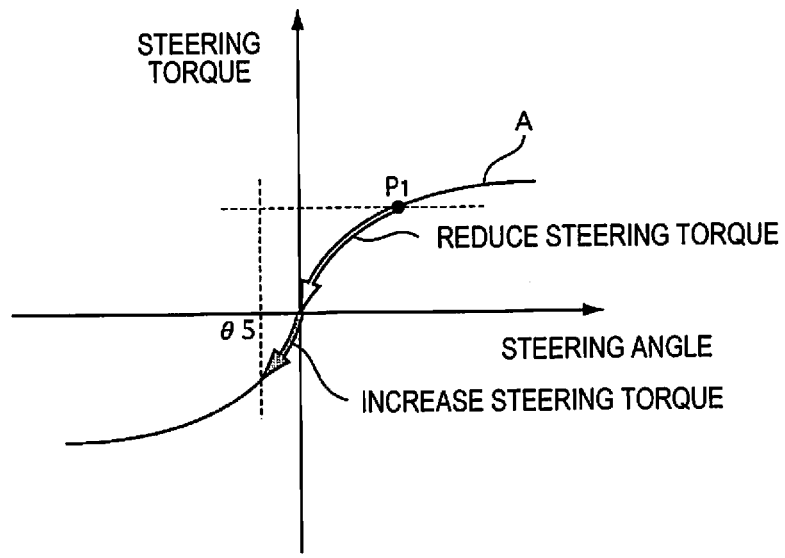
FIG. 19 is a characteristics diagram showing the relationship between the steering angle of the steering wheel and the steering torque of the driver.

Considered here in conventional steering reaction force control is the case in which the travel position of the vehicle is displaced to the right side due to an unexpected increased steering operation in the rightward direction by the driver, and the driver thereafter returns the travel position to the center vicinity of the travel lane using corrective steering. The steering angle and steering torque when the driver has carried out an unexpected operation is shown in the position of point $P_1$ on the characteristic A of FIG. 19. Characteristic A represents a relationship between the steering angle and the steering torque when a steering reaction force characteristic simulating a conventional steering device has been set. In order to return the travel position from this state to the center vicinity of the travel lane, the front wheels must be turned to the left, and therefore the driver, after having carried out a return operation to the steering angle neutral position, performs an increased steering operation from the steering angle neutral position to bring the steering wheel into alignment with a target angle $\theta_5$. At this point, in the above-described conventional technique, because the steering angle neutral position (zero point of the steering angle) and the steering torque neutral position (zero point of the steering torque) match each other, the steering torque must be reduced to the steering angle neutral position and the steering torque must be increased if the steering angle neutral position has been exceeded. In other words, when corrective steering for straddling the steering angle neutral position is carried out, the sign of the steering torque is inverted, the direction in which the driver controls force is switched, and the amount of change in the steering angle in relation to the amount of change in the steering torque in the vicinity of the steering torque neutral position is dramatically low in comparison with other steering angle regions. The steering burden on the driver is therefore high and it is difficult to bring the steering wheel to the target angle $\theta_5$. A problem is thereby created in which the travel position of the vehicle readily overshoots and thereby invites an increase in the amount of corrective steering.

Figure 20:
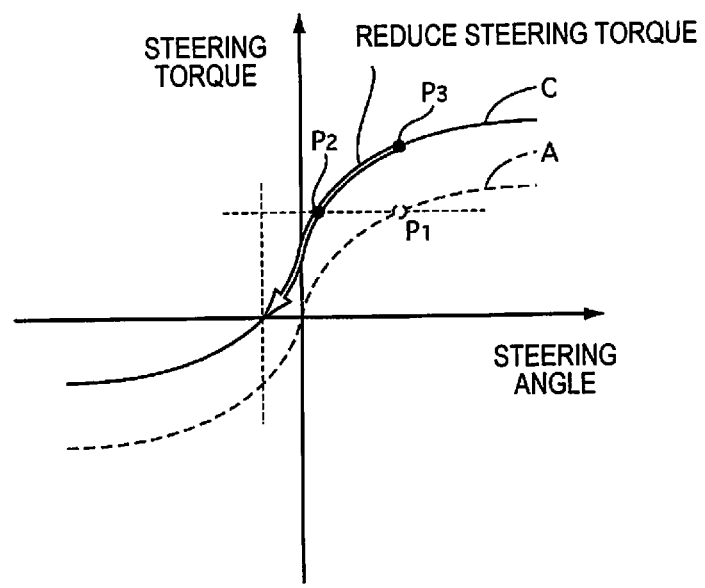
FIG. 20 is a diagram showing the state in which the characteristic showing the relationship between the steering angle of the steering wheel and the steering torque of the driver has changed due to the steering reaction force characteristic being offset in the direction in which the absolute value of the steering reaction force torque increases, the steering reaction force characteristic representing the steering reaction force torque that corresponds to the self-aligning torque.

In contrast, in the lateral position based reaction force offset control of the first embodiment, the steering reaction force torque that corresponds to the self-aligning torque is offset, in commensurate fashion to a shorter distance to the white line, in the direction in which the absolute value of the steering reaction force torque increases, whereby the characteristic representing the relationship between the steering angle and the turning angle is offset in the direction in which the absolute value of the steering torque increases, and the characteristic changes in continuous fashion from characteristic A to characteristic C in commensurate fashion to a shorter distance to the white line, as shown in FIG. 20. At this point, the steering torque must be increased in order to maintain the steering angle, and because the steering wheel 6 is gradually returned to the steering angle neutral position (point $P_1 \rightarrow$ point $P_2$) as long as the steering torque is constant, it is possible to suppress displacement of the travel position of the vehicle to the right side by an unexpected increased steering operation by the driver. On the other hand, when the driver has maintained the steering angle, the steering angle and the steering torque move from point $P_1$ to point $P_3$. When the driver performs corrective steering from this state, in characteristic C, the steering torque neutral position is offset to the increased steering side more greatly than to the steering angle neutral position, and the sign of the steering torque therefore does not invert until the steering torque arrives at the steering torque neutral position during increased steering operation from the steering angle neutral position. Consequently, the driver merely reduces the steering torque and stops rotating of the steering wheel 6 when the steering wheel 6 has reached a target angle to thereby control the turning angle of the front wheels 5L, 5R. In other words, in the lateral position based reaction force offset control in the first embodiment it is difficult to switch the direction in which the driver is controlling force, and corrective steering by the driver can therefore be facilitated. As a result, the travel position of the vehicle is not liable to overshoot and the amount of corrective steering can be reduced.

There it is a conventionally known technique to increase the steering reaction force in commensurate fashion in approach to the white line for the purpose of suppressing displacement of the travel position due to an unexpected operation by the driver, but in the conventional technique, the steering wheel is merely made more difficult to turn in commensurate fashion in approach to the white line, and because the steering torque neutral position in the steering reaction force characteristic constantly matches the steering angle neutral position, the sign of the steerage torque is inverted in corrective steerage which straddles the steerage angle neutral position, and the steering burden on the driver is not reduced. In other words, the steering reaction force torque that corresponds to the self-aligning torque is offset, in commensurate fashion to a shorter distance to the white line, in the direction in which the absolute value of the steering reaction force torque increases, thereby making it possible to implement both suppression of displacement of the travel position and reduction in the steering burden on the driver.

Also, in the lateral position based reaction force offset control of the first embodiment, the offset amount is increased as the distance to the white line is reduced, and the steering torque neutral position is therefore further offset toward a position away from the steering angle neutral position as the distance to the white line is reduced. When the driver carries out corrective steering for returning the travel position of the vehicle to the center vicinity of the travel lane, the increased steering amount from the steering angle neutral position must be increased in greater proximity to the white line. At this point, it is possible that the steering torque will exceed the neutral position and the sign of the steering torque will invert before the steering wheel reaches the target angle when the offset amount of the steering torque neutral position is low in relation to the steering angle neutral position. Consequently, increasing the offset amount as the distance to the white line is reduced makes it possible to suppress the steering torque from exceeding the neutral position.

In the lateral position based reaction force offset control of the first embodiment, the lateral position calculation unit Mb switches the lateral position in relation to the left and right white lines at the current position when the host vehicle has reached the white line. In lateral position based reaction force offset control, increasing the steering reaction force as the host vehicle moves away from the center vicinity of the travel lane makes it easier for the host vehicle to return to the center vicinity of the travel lane. In other words, the yaw angle integral value (change in the lateral position) is viewed as an external disturbance, and the steering reaction force is controlled so as to guide the vehicle in the direction that eliminates the yaw angle integral value. For this reason, the yaw angle integral value must be reset when a lane change is carried out. Were the yaw angle integral value not to be reset, operation by the driver would be obstructed because the steering reaction force for returning the vehicle to the center vicinity of the travel lane prior to the lane change would continue to have effect even after the lane change. Merely setting the integral value to zero does not allow the vehicle to be guided to the center vicinity of the travel lane after the lane change.

In view of the above, in the first embodiment, when the host vehicle has arrived at the white line, it is deemed to be an intentional operation by the driver, and the lateral position in relation to the left and right white lines in the current position is switched in such a case. In other words, inverting the sign of the yaw angle integral value switches the position for guiding the host vehicle from the center vicinity of the travel lane prior to the lane change to the center vicinity of the travel lane after the lane change, and allows the steering reaction force for guiding the host vehicle to the center vicinity of the travel lane after the lane change to be generated. At this point, consideration is given to the ratio $W_2/W_1$, which is the lane width $W_2$ of the travel lane after a lane change in relation to the lane width $W_1$ of the travel lane prior to a lane change, and it is therefore possible to set an accurate lateral position and to set an optimal offset amount for guiding the host vehicle to the center vicinity of the travel lane.

Effect of the 37 Based Reaction Force Offset Control 37 based reaction force offset control adds the 37 based reaction force as the steering reaction force torque offset amount to the steering reaction force torque. The steering reaction force characteristic representing the steering reaction force torque that corresponds to the self-aligning torque is thereby offset in the direction in which the absolute value of the steering reaction force torque increases as the 37 is reduced, as shown in FIG. 18. FIG. 18 shows the case of the host vehicle being near the right lane, and when the host vehicle is near the left lane, the offset occurs in the direction opposite of that in FIG. 18.

For this reason, the characteristic representing the relationship between the steering angle and the steering torque is offset in the direction in which the absolute value of the steering torque increases, and the characteristic changes in continuous fashion from characteristic A to characteristic C in commensurate fashion to a smaller 37, as shown in FIG. 20. At this point, the steering torque must be increased in order to maintain the steering angle, and because the steering wheel 6 is gradually returned to the steering angle neutral position (point $P_1 \rightarrow$ point $P_2$) as long as the steering torque is constant, it is possible to suppress displacement of the travel position of the vehicle to the right side by an unexpected increased steering operation by the driver. On the other hand, when the driver has maintained the steering angle, the steering angle and the steering torque move from point $P_1$ to point $P_3$. When the driver performs corrective steering from this state, in characteristic C, the steering torque neutral position is offset to the increased steering side more greatly than to the steering angle neutral position, and the sign of the steering torque therefore does not invert until the steering torque arrives at the steering torque neutral position during increased steering operation from the steering angle neutral position. Consequently, the driver merely reduces the steering torque and stops rotation of the steering wheel 6 when the steering wheel 6 has reached a target angle to thereby control turning angle of the front wheels 5L, 5R. In other words, in the 37 based reaction force offset control in the first embodiment, it is difficult to switch the direction in which the driver is controlling force, and corrective steering by the driver can therefore be facilitated. As a result, the travel position of the vehicle is not liable to overshoot and the amount of corrective steering can be reduced.

Also, in the 37 based reaction force offset control of the first embodiment, the offset amount is increased as the 37 decreases, and the steering torque neutral position is therefore further offset toward a position away from the steering angle neutral position as the 37 decreases. When the driver carries out corrective steering for returning the travel position of the vehicle to the center vicinity of the travel lane, the possibility that the host vehicle is near the white line increases as the 37 decreases, and the increased steering operation amount from the steering angle neutral position must be increased in commensurate fashion in proximity to the white line. At this point, it is possible that the steering torque will exceed the neutral position and the sign of the steering torque will invert before the steering wheel reaches the target angle when the offset amount of the steering torque neutral position is low in relation to the steering angle neutral position. Consequently, increasing the offset amount as the distance to the white line is reduced makes it possible to suppress the steering torque from exceeding the neutral position.

Combined Effect of the Lateral Position and 37 Based Reaction Force Offset Controls In the steering reaction force control unit 20, the greater of the absolute values of the 37 based reaction force and the lateral position based reaction force is selected as the steering reaction force offset amount in the steering reaction force torque offset unit 36, and the steering reaction force offset amount is added to the steering reaction force torque in the adder 20c. The 37 or the lateral position-corresponding steering reaction force characteristic is offset in the direction in which the absolute value of the steering reaction force torque increases. In the 37 based reaction force offset control, the 37 based reaction force is zero when the host vehicle and the white line are parallel, i.e., when the yaw angle is zero. For this reason, only a small amount of reaction force is applied when the yaw angle is low, even when the host vehicle is in a position near the white line. In contrast, in lateral position based reaction force offset control, the reaction force (the reaction force that corresponds to the lateral position) is generated in proportion to the distance to the white line, and a greater reaction force can therefore be produced in commensurate fashion to a shorter distance to the white line, and the host vehicle can be readily returned to the center vicinity of the travel lane.

On the other hand, in lateral position based reaction force offset control, the reaction force that corresponds to the lateral position is zero when the host vehicle is in the center vicinity of the travel lane. Accordingly, it is difficult to increase the steering reaction force with good responsiveness in relation to arriving at the white line in a short period of time when the yaw angle is great and the vehicle speed is furthermore high, even in the center vicinity of the travel lane. In contrast, in 37 based reaction force offset control, a reaction force (37 based reaction force) that corresponds to the 37 is generated and said reaction force is characteristic in rapidly rising when the 37 is three seconds or less. Therefore, the steering reaction force can be increased with good responsiveness, and lane deviation can be suppressed even when there is a short period of time to arrival at the white line. Consequently, using the 37 based reaction force offset control and the lateral position based reaction force offset control in combination makes it possible to impart a stable reaction force in accordance with the distance to the white line and to effectively suppress lane deviation. At this point, using the larger of the absolute values of the 37 based reaction force and the lateral position based reaction force makes it possible to constantly impart a required steering reaction force in an optimal manner.

As described above, the first embodiment has the following listed effects.

(1) A stability control device comprises: a steering wheel 6 for receiving steering input from a driver; a turning part 2 for turning left and right front wheels 5FL, 5FR, the turning part being mechanically separated from the steering wheel 6; a turning control unit 19 for controlling the turning angle of the left and right front wheels 5FL, 5FR in accordance with a steering angle of the steering wheel 6; a steering reaction force control unit 20 for controlling steering reaction force imparted to the steering wheel 6 in accordance with a turning state of the turning part 2; a yaw angle calculation unit 32a for detecting a yaw angle, which is an angle formed by a white line and the traveling direction of the host vehicle; a yaw angle based reaction force calculation unit 37 for computing the reaction force (yaw angle based reaction force) of the vehicle for suppressing the detected yaw angle; a lateral position based repulsive force calculation unit 38 for computing a repulsive force (lateral position based repulsive force) for returning the host vehicle to the center of the lane when the host vehicle has departed from the center of the lane; and a electric current driver 22 for controlling the left and right front wheels 5FL, 5FR based on the yaw angle based reaction force and the lateral position based reaction force; the steering reaction force control unit 20 setting to zero the steering reaction force corresponding to the yaw angle based reaction force. It is thereby not required to impart a steering reaction force component for urging a turn for suppressing an external disturbance, and since it is possible to suppress fluctuation in the steering reaction force caused by a turn for suppressing a yaw angle, an unpleasant sensation experienced by the driver can be reduced.

(2) The lateral position based repulsive force calculation unit 38 computes the turning amount for reducing an integral value (change in the lateral position) of the detected yaw angle. Change in the yaw angle caused by a transient external disturbance and the integral value (change in the lateral position) of the yaw angle caused by a steady external disturbance can both be reduced, and the stability of the vehicle can be improved in relation to both transient and steady external disturbances.

(3) The steering reaction force control unit 20 sets the steering reaction force corresponding to the lateral position based reaction force to zero. It is thereby possible to suppress fluctuation in the steering reaction force caused by imparting an external disturbance suppression command turning angle for returning the host vehicle to the center of the lane, and an unpleasant sensation experienced by the driver can be reduced.

(4) The stability control device comprises a lateral force calculation unit 33 and a SAT calculation unit 35 for estimating self-aligning torque based on the steering angle of the steering wheel 6, and the steering reaction force control unit 20 controls the steering reaction force based on the estimated self-aligning torque. Because fluctuation in the tire lateral force produced by a turn for suppressing an external disturbance is not reflected in the steering reaction force, an unpleasant sensation experienced by the driver can be reduced.

(5) The stability control device comprises a camera 17 for capturing a white line forward of the host vehicle, and the yaw angle calculation unit 32a computes a yaw angle based on an angle formed by the white line captured by the camera 17 and the traveling direction of the host vehicle. The yaw angle can thereby be detected with high precision in a simple manner.

(6) When left and right front wheels 5FL, 5FR mechanically separated from a steering wheel 6 are to be controlled, the turning angle is controlled based on a SBW command turning angle that corresponds to a steering angle of the steering wheel 6, and an external disturbance suppression command turning angle for suppressing the yaw angle and displacement from the center of the lane, and meanwhile a steering reaction force corresponding to the external disturbance suppression command turning angle for yaw angle suppression is limited to a predetermined value or less. It is thereby not required to impart a steering reaction force component for urging a turn for suppressing an external disturbance, and because it is possible to suppress fluctuation in the steering reaction force caused by a turn for yaw angle suppression, an unpleasant sensation experienced by the driver can be reduced.

(7) A stability control device comprises: a yaw angle calculation unit 32a for detecting a yaw angle, which is an angle formed by a white line and a traveling direction of a host vehicle; and a turning control unit 19 for controlling a turning angle based on a SBW command turning angle that corresponds to a steering angle of the steering wheel 6, and an external disturbance suppression command turning angle for suppressing the yaw angle and displacement from the center of the lane, and meanwhile limiting a steering reaction force corresponding to the external disturbance suppression command turning angle for yaw angle suppression to a predetermined value or less. It is thereby not required to impart a steering reaction force component for urging a turn for suppressing an external disturbance, and because it is possible to suppress fluctuation in the steering reaction force caused by a turn for yaw angle suppression, an unpleasant sensation experienced by the driver can be reduced.

The invention claimed is:

1. A stability control device comprising:
   a steering unit configured to receive steering input from a driver;
   a turning part configured to turn a turnable wheel, the turning part being mechanically separated from the steering unit;
   a steer-by-wire controller programmed to include
      a steer-by-wire turning amount calculation unit that computes a steer-by-wire turning amount that corresponds to a turning amount of the steering unit;
      a yaw angle detection unit that detects a yaw angle, which is an angle formed by a white line and a traveling direction of a host vehicle;
      a yaw-angle-suppressing turning amount calculation unit that computes a yaw angle-suppressing turning amount for suppressing the yaw angle detected by the yaw angle detection unit;
      a lane-center-returning turning amount calculation unit that computes a lane-center-returning turning amount for returning the host vehicle to a center of a lane when the host vehicle has departed from the center of the lane;
      a turning control unit that controls a turning amount of the turning part based on the steer-by-wire turning amount, the yaw angle-suppressing turning amount, and the lane-center-returning turning amount; and
      a steering reaction force control unit that controls a steering reaction force based on a steering amount of the steering unit without the yaw angle-suppressing turning amount and the lane-center-returning turning amount being reflected in the steering reaction force imparted to the steering unit.

2. The stability control device according to claim 1, wherein
   the steering reaction force control unit is programmed to control the steering reaction force imparted to the steering unit based on the steer-by-wire turning amount.

3. The stability control device according to claim 1, wherein
   the steer-by-wire controller comprises a turning state estimation unit programmed to estimate a turning state of the turning part based on the steering amount of the steering unit,
   the steering reaction force control unit is programmed to control the steering reaction force based on the turning state estimated by the turning state estimation unit.

4. The stability control device according to claim 1, further comprises
 a camera for capturing an image of the white line forward of the host vehicle,
 the yaw angle detection unit detects the yaw angle based on the angle formed by the white line captured by the camera and the traveling direction of the host vehicle.

5. A stability control method comprising:
 controlling, by a controller, a turning part mechanically separated from a steering unit, according to a turning amount of the turning part based on a steer-by-wire turning amount that corresponds to a steering amount of the steering unit, a turning amount for suppressing a yaw angle, which is an angle formed by a white line and a traveling direction of a host vehicle, and a turning amount for returning the host vehicle to the center of a lane when the host vehicle has departed from the center of the lane; and
 controlling, by a controller, a steering reaction force based on the steering amount without the yaw angle-suppressing turning amount and the lane-center-returning turning amount being reflected in the steering reaction force imparted to the steering unit.

6. A stability control device comprising:
 a sensor for detecting a yaw angle, which is an angle formed by a white line and a traveling direction of a host vehicle; and
 a controller programmed such that, when a turning part mechanically separated from a steering unit is to be controlled, the controller controls
  a turning amount of the turning part based on a steer-by-wire turning amount that corresponds to a steering amount of the steering unit, a turning amount for suppressing the yaw angle, which is an angle formed by a white line and a traveling direction of a host vehicle, and a turning amount for returning the host vehicle to the center of a lane when the host vehicle has departed from the center of the lane, and
  a steering reaction force based on the steering amount without the yaw angle-suppressing turning amount and the lane-center-returning turning amount being reflected in the steering reaction force imparted to the steering unit.

* * * * *